United States Patent
Kraus et al.

(10) Patent No.: US 7,195,317 B2
(45) Date of Patent: Mar. 27, 2007

(54) FITTING FOR A VEHICLE SEAT

(75) Inventors: Martin Kraus, Katzenbach (DE); Olaf Kreuels, Zweibrücken (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/237,452

(22) Filed: Sep. 28, 2005

(65) Prior Publication Data

US 2006/0061181 A1    Mar. 23, 2006

Related U.S. Application Data

(63) Continuation of application No. PCT/EP2004/004026, filed on Apr. 16, 2004.

(30) Foreign Application Priority Data

Apr. 24, 2003    (DE)    ................ 103 18 551

(51) Int. Cl.
*B60N 2/02*    (2006.01)
(52) U.S. Cl. ................ 297/366
(58) Field of Classification Search ........... 297/366, 297/367, 368, 369, 370, 371
See application file for complete search history.

(56) References Cited

U.S. PATENT DOCUMENTS 4,709,965 A  *  12/1987  Kazaoka et al. .......... 297/366

| | | | |
|---|---|---|---|
| 6,540,297 B2 | 4/2003 | Hänsel et al. | |
| 2002/0145315 A1 | 10/2002 | Fraley et al. | |
| 2003/0030315 A1 | 2/2003 | Shephard | |

FOREIGN PATENT DOCUMENTS

| | | |
|---|---|---|
| DE | 199 18 923 C1 | 5/2000 |
| DE | 100 52 092 A1 | 5/2002 |
| DE | 101 52 400 A1 | 7/2002 |
| EP | 0 506 580 A1 | 9/1992 |
| WO | WO 01/62540 A1 | 8/2001 |

* cited by examiner

*Primary Examiner*—Milton Nelson, Jr.
(74) *Attorney, Agent, or Firm*—Womble Carlyle Sandridge & Rice, PLLC

(57)    ABSTRACT

In a fitting (1) for a vehicle seat, in particular a motor vehicle seat, having a first fitting part (5), a second fitting part (8) that is pivotably mounted relative to the first fitting part (5) by way of a backrest bolt (10), a locking pawl that is pivotably mounted on the first fitting part (5) by way of a pawl bolt (13) and that is interacting with the second fitting part (8) to lock the fitting (1), and two braces (49) arranged on the outer side of the first fitting part (5) between the backrest bolt (10) and the pawl bolt (13), the backrest bolt is additionally structure-fixedly supported on the first fitting part (5) and/or a structure part (7).

17 Claims, 2 Drawing Sheets

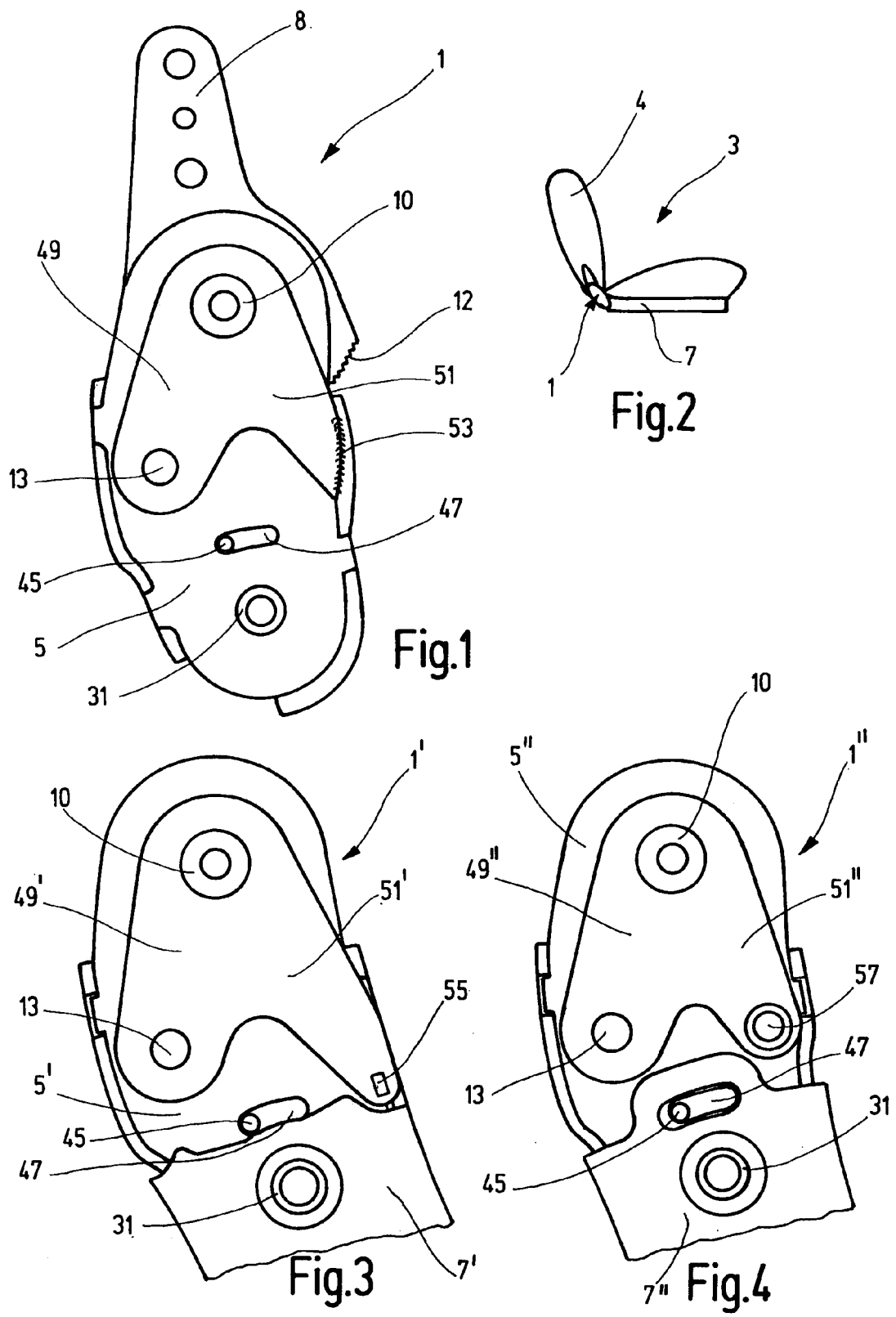

FITTING FOR A VEHICLE SEAT

CROSS-REFERENCE TO RELATED APPLICATION

The present application is a continuation of International Application PCT/EP2004/004026, which was filed Apr. 16, 2004. The disclosure of PCT/EP2004/004026 is incorporated herein by reference, in its entirety.

BACKGROUND OF THE INVENTION

The present invention relates to a fitting for a vehicle seat, with the fitting having a first fitting part; a second fitting part that is mounted for pivoting with respect to the first fitting part by means of a backrest bolt; a locking pawl that is pivotably mounted on the first fitting part by means of a pawl bolt, and is for interacting with the second fitting part to lock the fitting; and two braces arranged on the outer side of the first fitting part between the backrest bolt and the pawl bolt.

A fitting of the immediately above-described type is disclosed in DE 100 52 092 A1, which corresponds to U.S. Pat. No. 6,540,297. DE 100 52 092 A1 provides braces between the backrest bolt and the pawl bolt. The braces are for ensuring, particularly in the event of a frontal crash, mutual support of the two bolts and a constant distance therebetween, so that the degree of overlap of the teeth of the lock remains unchanged and safety is thereby increased.

BRIEF SUMMARY OF SOME ASPECTS OF THE INVENTION

An aspect of the present invention is the provision of improvements to a fitting of the type described above. In accordance with one aspect of the present invention, a fitting for a vehicle seat, in particular for a motor vehicle seat, has a first fitting part; a second fitting part that is mounted for pivoting with respect to the first fitting part by means of a backrest bolt; a locking pawl that is pivotably mounted on the first fitting part by means of a pawl bolt, and is for interacting with the second fitting part to lock the fitting; and two braces arranged on the outer side of the first fitting part between the backrest bolt and the pawl bolt, wherein the backrest bolt is additionally supported by the first fitting part and/or structure of the seat part of the vehicle seat.

Because the backrest bolt is additionally supported by the first fitting part and/or the structure of the seat part of the vehicle seat, the crash forces can also be absorbed in a direction other than the line connecting the backrest bolt and the pawl bolt, for example in the event of a rear-end crash. The braces are preferably mounted on the backrest bolt as well as on the pawl bolt, supporting the pawl bolt on the backrest bolt and thereby creating a direct link between the two bolts. The additional support is preferably provided by the additional attachment of one or both braces on the first fitting part and/or the structure of the seat part of the vehicle seat, or by another brace that is connected with or formed onto (e.g., part of) the first fitting part or the structure of the seat part. The braces are preferably made of high-strength steel to be able to absorb the occurring pulling forces.

For the additional attachment of the braces, they preferably include a formed-on arm that serves to support the direction deviating from the line connecting the backrest bolt and the pawl bolt. The best relation of forces is provided with the arm extending obliquely downward from the line connecting the backrest bolt and the pawl bolt; i.e. at an acute angle from it. The arm may be materially connected or contour locked to the first fitting part and/or the structure of the seat part of the vehicle seat.

The additional attachment preferably occurs on that side which is opposite the side closest to the pawl bolt, in order to improve the support action by means of the spatially extended arrangement. Thus, if the pawl bolt is mounted closer to the side that is further back (in the direction of travel), the additional attachment is preferably provided on the side that is further to the front (in the direction of travel).

The fitting according to the invention is preferably used in the backseat unit in the rear of a motor vehicle, for example in a so-called van. However, it can also be used in a front passenger seat or in other seat rows.

Other aspects and advantages of the present invention will become apparent from the following.

BRIEF DESCRIPTION OF THE DRAWINGS

In the following Detailed Description section, three exemplary embodiments of the invention, including a number of variations, are explained with reference to the drawings, in which:

FIG. 1 shows a lateral view of the first exemplary embodiment,

FIG. 2 shows a schematic side view of a vehicle seat,

FIG. 3 shows a partial view of the first variation of the first exemplary embodiment, FIG. 4 shows a partial view of the second variation of the first exemplary embodiment.

DETAILED DESCRIPTION OF EMBODIMENTS

Figure 5:
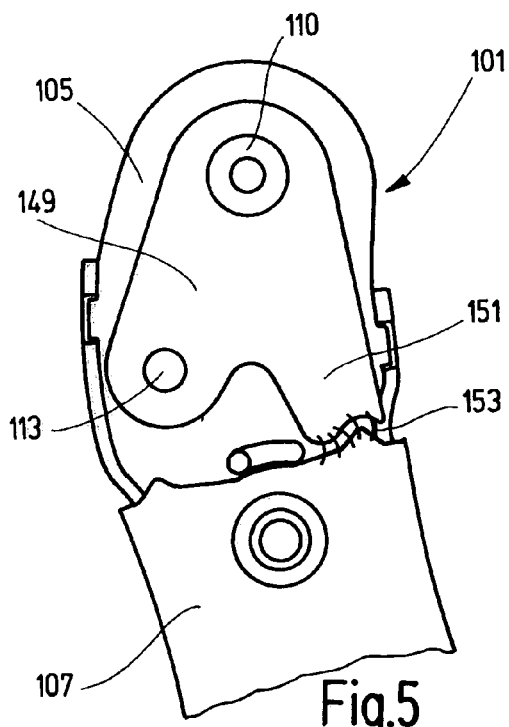
FIG. 5 shows a partial view of the second exemplary embodiment.

According to the first exemplary embodiment of the present invention, a fitting 1 is provided for a vehicle seat 3 of a motor vehicle. The arrangement of the vehicle seat 3 in the motor vehicle and the vehicle's normal direction of travel define the following indications of direction. Fittings 1 are respectively arranged on the opposite sides of the vehicle seat. The fittings 1, mirror-inverted in shape, bear the backrest 4 of the vehicle seat 3 and serve to adjust the backrest's inclination.

Each fitting 1 has a lower fitting part 5 and an upper fitting part 8. The lower fitting part 5 is firmly attached to structure 7 of the seat part of the vehicle seat 3, i.e. more precisely, on a lateral part of the seat frame. The upper fitting part 8 is firmly attached to the structure of the backrest 4. The lower fitting part 5 consists of two parts that have overlapping marginal areas and are joined to form a hollow profile (e.g., to at least partially define and enclose a hollow interior space of the lower fitting part). The upper fitting part 8 is pivotably mounted in the lower fitting part 5 by means of a backrest bolt 10 that provides the upper fitting part's axis of rotation which is aligned in the y-direction (i.e. horizontally and transversally to the direction of travel). As a result, the backrest 4 is pivotable relative to the seat part of the vehicle seat 3.

The fitting 1 is in the form of a detent fitting, such as the detent fitting described in DE 100 52 092 A1. The disclosure of DE 100 52 092 A1 (which corresponds to U.S. Pat. No.

6,540,297) is incorporated herein by reference, in its entirety. On its lower end that is facing away from the backrest 4, the upper fitting part 8 bears a toothed gear 12 concentrically with respect to the backrest bolt 10. A locking pawl (not shown) is pivotably mounted on a pawl bolt 13 that is fixedly attached to the lower fitting part 5. The locking pawl engages the toothed gear 12 in order to lock the fitting 1. In normal operation, the locking pawl is secured by means of a clamping eccentric (not shown) and, in the event of a crash, by a catching piece (not shown). The clamping eccentric and the catching piece are both pivotably mounted on a securing bolt 31. An unlocking bolt 45, which is mounted on the catching piece, extends through a slot 47 in the lower fitting part 5.

Braces 49 made of high-strength steel (e.g. 25CrMoY) are respectively arranged on the outer sides of the lower fitting part 5. Each of the two braces 49 is mounted on the backrest bolt 10 as well as on the pawl bolt 13, so that the pawl bolt 13 is supported by the backrest bolt 10. In addition, the two braces 49 are connected with the lower fitting part 5 in a way that is specific for each of the exemplary embodiments. In the first exemplary embodiment, each brace 49 includes an arm 51 that is part of the brace and extends obliquely downward at an acute angle from the line connecting the backrest bolt 10 and the pawl bolt 13, resulting in the form of an inverted V. This arm 51 is welded, or is otherwise materially connected (e.g., connected by a connecting material), to the front side of the lower fitting part 5. The connecting material (e.g., weld) connecting the arm 51 to the front side of the lower fitting part 5 is designated by numeral 53. In the present case, the front side means the (narrow) side facing forward in the direction of travel, and the pawl bolt 13 is arranged closer to the (narrow) side facing backward in the direction of travel.

In the event of a frontal crash, described in detail in the DE 100 52 092 A1 (and corresponding U.S. Pat. No. 6,540,297), a portion of the crash forces coming from the backrest 4 are channeled via the toothed gear 12, as an opening moment, to the locking pawl. Without the braces 49, the backrest bolt 10 would travel upward, and the pawl bolt 13 would be pushed backward, thereby reducing the degree of overlap of the toothed gear 12 and the locking pawl. Due to the braces 49, the pawl bolt 13 is kept at a constant distance from the backrest bolt 10, so that, in the event of a crash, the pawl bolt 13 is pulled upward, following the backrest bolt 10, thus maintaining the engagement between the toothed gear 12 and the pawl completely or almost completely.

In the event of a rear-end crash, the upper fitting part 8 pivots backward and is pulled upward. Through the arm 51 acting between the lower fitting part 5 and the backrest bolt 10, the backrest bolt 10, which is thus additionally supported, is held back, i.e. the distance between the toothed gear 12 and the locking pawl is only insignificantly reduced, so that the degree of overlap is maintained in this case as well, at least almost.

A first variation of the first exemplary embodiment, illustrated in FIG. 3, is largely the same as the first exemplary embodiment, unless described otherwise. For this reason, like components have the same reference signs and modified components have reference signs followed by one apostrophe. In this fitting 1', the brace 49' with its arm 51' is not materially connected to the lower fitting part 5; rather, the arm 51' is contour locked to the lower fitting part 5'. A profiled lug 55 of the lower fitting part 5' is fitted in a recess with a corresponding profile in the arm 51'. The seat part structure 7' has a cutout for receiving the securing bolt 31.

A second variation of the first exemplary embodiment, illustrated in FIG. 4, is largely the same as the first exemplary embodiment, unless otherwise described. For this reason, like components have the same reference signs and modified components have reference signs followed by two apostrophes. In this fitting 1", the brace 49" with its arm 51" is also not materially connected with the lower fitting part 5". Rather, the arm 51" is riveted to the lower fitting part 5" by means of a rivet 57. The seat part structure 7" has a cutout for the securing bolt 31 and the sliding slot 47.

The second exemplary embodiment, unless described otherwise, is similar to the first exemplary embodiment. For this reason, like components or components having like functions have reference signs that are higher by 100. The lower fitting part 105 of the fitting part 101 is again connected with the structure 107 of the seat part of the vehicle seat, more precisely with the lateral part of the seat frame. The backrest bolt 110 and the pawl bolt 113 support each other on each outer side of the lower fitting part 105 through a brace 149. The brace 149 has an arm 151 that is connected by material to (e.g., welded to) both the structure 107 and the lower fitting part 105. The weld seam for this triple weld has the reference sign 153. That is, the weld 153 is welded to each of the arm 151, structure 107 and lower fitting part 105.

Figure 6:
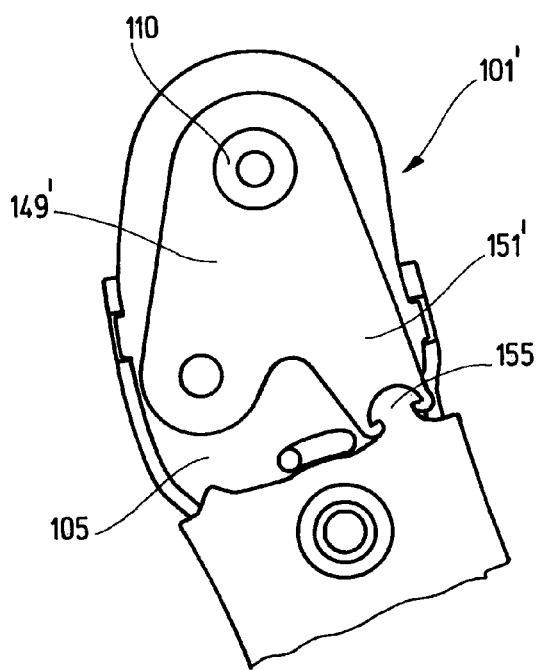
FIG. 6 shows a partial view of the variation of the second exemplary embodiment.
Figure 7:
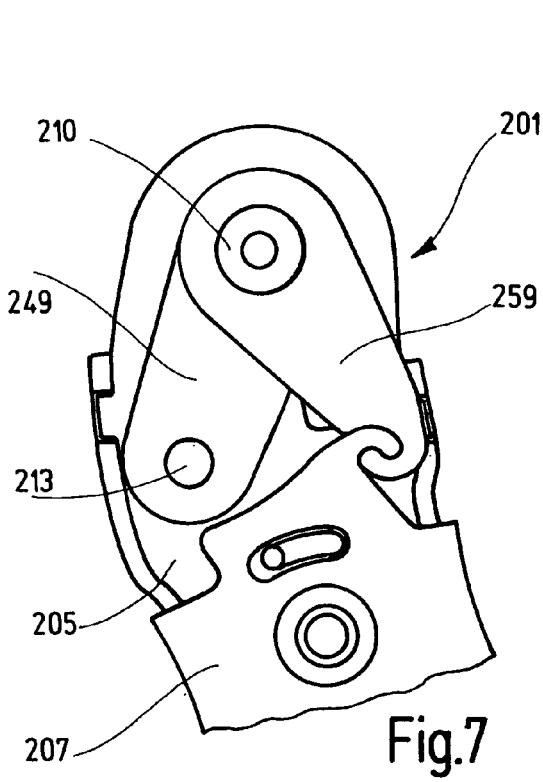
FIG. 7 shows a partial view of the third exemplary embodiment.

A variation of the second exemplary embodiment, illustrated in FIG. 6, is largely the same as the second exemplary embodiment, unless described otherwise, thus like components have the same reference signs and modified components have reference signs followed by one apostrophe. In this fitting 101', the brace 149' with its arm 151' is not materially connected with the seat part structure 107' (and the lower fitting part 105); rather, it is contour locked. A mushroom-shaped lug 155 of the seat part structure 107' extends into a correspondingly shaped recess on the arm 151'. The lug 155 and the recess can also be of different shape.

The third exemplary embodiment, unless described otherwise, is similar to the two other exemplary embodiments. For this reason, like components or components having like functions have reference signs that are higher by 200 and 100, respectively. The lower fitting part 205 of the fitting 201 is again connected with the structure 207 of the seat part of the vehicle seat, more precisely with a lateral part of the seat frame. The backrest bolt 210 and the pawl bolt 213 support each other on each outer side of the lower fitting part 205 through a brace 249. Another brace 259 made from high-strength steel is arranged on the outer side of each brace 249. The brace 259 is penetrated, on the one hand, by the backrest bolt 210 (i.e. sitting on it/mounted to it) and, on the other hand, reaches around a hook of the seat part structure 207 in a contour-locked manner. The backrest bolt 210 is thus additionally supported in the event of a rear-end crash and is secured against pulling forces. The other brace 259 is aligned approximately like the arm of the brace in the preceding exemplary embodiments.

Figure 8:
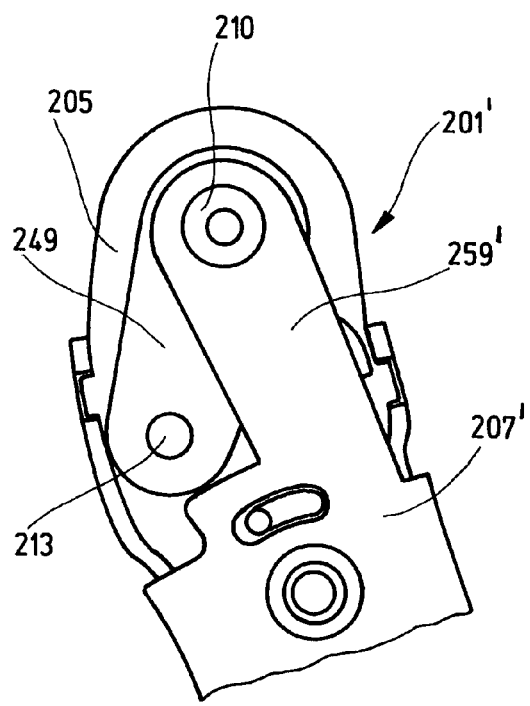
FIG. 8 shows a partial view of the variation of the third exemplary embodiment.

A variation of the third exemplary embodiment, illustrated in FIG. 8, is largely the same as the third exemplary embodiment, unless described otherwise, thus like components have the same reference signs and components having like functions have reference signs followed by an apostrophe. In this fitting 201', the other brace 259' provided for additional support of the backrest bolt 210 is formed onto (e.g., is part of) the seat part structure 207', i.e. the two parts form a single component.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A fitting for a vehicle seat that includes at least a seat part, the fitting comprising:
    a first fitting part that at least partially defines and encloses a hollow interior space;
    a backrest bolt mounted to the first fitting part;
    a second fitting part mounted on the backrest bolt for pivoting relative to the first fitting part;
    a pawl bolt mounted to the first fitting part;
    a locking pawl mounted on the pawl bolt for pivoting relative to the first fitting part and interacting with the second fitting part to releasably lock the fitting; and
    at least a first brace and a second brace,
    wherein the first brace is positioned at least at a first outer side of the first fitting part, and the first brace is mounted to at least both the backrest bolt and the pawl bolt so that the pawl bolt is supported, via the first brace, by the backrest bolt,
    wherein the second brace is positioned at least at a second outer side of the first fitting part, and the second brace is mounted to at least both the backrest bolt and the pawl bolt so that the pawl bolt is supported, via the second brace, by the backrest bolt,
    wherein at least the second brace is connected to at least one structure so that the backrest bolt is supported, via the second brace, by said structure,
    wherein said structure is selected from the group consisting of
        (a) the first fitting part, and
        (b) structure of the seat part, and
    wherein at least the second brace includes an arm that extends obliquely with respect to an imaginary straight line that extends from the backrest bolt to the pawl bolt.

2. The fitting according to claim 1, wherein the locking pawl is at least partially positioned in the hollow interior space of the first fitting part.

3. The fitting according to claim 1, wherein the second brace being connected to said structure comprises the arm being contour locked to said structure.

4. The fitting according to claim 1, wherein the first and second braces are made from high-strength steel.

5. The fitting according to claim 1 in combination with the vehicle seat, wherein the vehicle seat further includes a backrest, and the backrest is mounted to the second fitting part.

6. The fitting according to claim 1, wherein the second brace being connected to said structure comprises the arm being connected to said structure.

7. The fitting according to claim 1, wherein the arm extends generally downward so that an acute angle is defined between the arm and the imaginary straight line that extends from the backrest bolt to the pawl bolt.

8. The fitting according to claim 7, wherein:
    the first and second outer sides of the first fitting part are opposite from one another,
    the first fitting part further includes a front side that extends between the first and second outer sides of the first fitting part, and
    the second brace being connected to said structure comprises the arm being connected to the front side of the first fitting part.

9. The fitting according to claim 7, wherein the second brace being connected to said structure comprises the arm being contour locked to said structure.

10. A fitting for a vehicle seat that includes at least a seat part, the fitting comprising:
    a first fitting part that at least partially defines and encloses a hollow interior space;
    a backrest bolt mounted to the first fitting part;
    a second fitting part mounted on the backrest bolt for pivoting relative to the first fitting part;
    a pawl bolt mounted to the first fitting part;
    a locking pawl mounted on the pawl bolt for pivoting relative to the first fitting part and interacting with the second fitting part to releasably lock the fitting; and
    at least a first brace and a second brace, wherein
    the first brace is positioned at least at a first outer side of the first fitting part, and the first brace is mounted to at least both the backrest bolt and the pawl bolt so that the pawl bolt is supported, via the first brace, by the backrest bolt,
    the second brace is positioned at least at a second outer side of the first fitting part, and the second brace is mounted to at least both the backrest bolt and the pawl bolt so that the pawl bolt is supported, via the second brace, by the backrest bolt,
    at least the second brace is connected to at least one structure so that the backrest bolt is supported, via the second brace, by said structure,
    said structure is selected from the group consisting of
        (a) the first fitting part, and
        (b) structure of the seat part,
    at least the second brace includes an arm,
    the first and second outer sides of the first fitting part are opposite from one another,
    the first fitting part further includes a front side that extends between the first and second outer sides of the first fitting part, and
    the second brace being connected to said structure comprises the arm being connected to the front side of the first fitting part.

11. The fitting according to claim 10, wherein the arm extends obliquely with respect to an imaginary straight line that extends from the backrest bolt to the pawl bolt.

12. A fitting for a vehicle seat that includes at least a seat part, the fitting comprising:
    a first fitting part that at least partially defines and encloses a hollow interior space;
    a backrest bolt mounted to the first fitting part;
    a second fitting part mounted on the backrest bolt for pivoting relative to the first fitting part;
    a pawl bolt mounted to the first fitting part;
    a locking pawl mounted on the pawl bolt for pivoting relative to the first fitting part and interacting with the second fitting part to releasably lock the fitting; and
    at least a first brace and a second brace,
    wherein the first brace is positioned at least at a first outer side of the first fitting part, and the first brace is mounted to at least both the backrest bolt and the pawl bolt so that the pawl bolt is supported, via the first brace, by the backrest bolt,
    wherein the second brace is positioned at least at a second outer side of the first fitting part, and the second brace is mounted to at least both the backrest bolt and the pawl bolt so that the pawl bolt is supported, via the second brace, by the backrest bolt,
    wherein at least the second brace is connected to at least one structure so that the backrest bolt is supported, via the second brace, by said structure,
    wherein said structure is selected from the group consisting of (a) the first fitting part, and
(b) structure of the seat part,
wherein at least the second brace includes an arm, and
wherein the second brace being connected to said structure comprises the arm being welded to said structure.

13. A fitting for a vehicle seat that includes at least a seat part, the fitting comprising:
a first fitting part that at least partially defines and encloses a hollow interior space;
a backrest bolt mounted to the first fitting part;
a second fitting part mounted on the backrest bolt for pivoting relative to the first fitting part;
a pawl bolt mounted to the first fitting part;
a locking pawl mounted on the pawl bolt for pivoting relative to the first fitting part and interacting with the second fitting part to releasably lock the fitting; and
at least a first brace and a reinforcement,
wherein the first brace is positioned at least at a first outer side of the first fitting part, and the first brace is mounted to at least both the backrest bolt and the pawl bolt so that the pawl bolt is supported, via the first brace, by the backrest bolt,
wherein the reinforcement is positioned at least at a second outer side of the first fitting part,
wherein the reinforcement is mounted to at least both the backrest bolt and the pawl bolt so that the pawl bolt is supported, via the reinforcement, by the backrest bolt,
wherein there is at least one cooperative interaction between a portion of the reinforcement and at least one structure so that the backrest bolt is supported, via the reinforcement, by said structure,
wherein said structure is selected from the group consisting of
(a) the first fitting part, and
(b) structure of the seat part, and
wherein said cooperative interaction is the reinforcement being connected to said structure by way of a weld.

14. The fitting according to claim 13, wherein the locking pawl is at least partially positioned in the hollow interior space of the first fitting part.

15. The fitting according to claim 13, wherein:
the reinforcement comprises a second brace;
the reinforcement being mounted to at least both the backrest bolt and the pawl bolt comprises the second brace being mounted to at least both the backrest bolt and the pawl bolt;
and
the portion of the reinforcement is a portion of the second brace.

16. The fitting according to claim 13, wherein:
the reinforcement comprises a second brace and a third brace;
the reinforcement being mounted to at least both the backrest bolt and the pawl bolt comprises
(a) the second brace being mounted to at least both the backrest bolt and the pawl bolt, and
(b) the third brace being mounted to at least the backrest bolt; and
the portion of the reinforcement is a portion of the third brace.

17. The fitting according to claim 13 in combination with the vehicle seat, wherein the vehicle seat further includes a backrest, and the backrest is mounted to the second fitting part.

* * * * *